US008701029B2

(12) United States Patent
Havivi (10) Patent No.: US 8,701,029 B2
(45) Date of Patent: Apr. 15, 2014

(54) PRESENTING A MODAL DIALOG BOX USING AN INVISIBLE PANEL UNDERNEATH

(75) Inventor: Shahar Havivi, Ramat-Gan (IL)

(73) Assignee: Red Hat Israel, Ltd., Raanana (IL)

( * ) Notice: Subject to any disclaimer, the term of this patent is extended or adjusted under 35 U.S.C. 154(b) by 350 days.

(21) Appl. No.: 12/491,052

(22) Filed: Jun. 24, 2009

(65) Prior Publication Data

US 2010/0332989 A1 Dec. 30, 2010

(51) Int. Cl.
*G06F 3/0481* (2013.01)

(52) U.S. Cl.
USPC ........... 715/768; 715/764; 715/760; 715/210; 717/109; 717/106; 706/10

(58) Field of Classification Search
USPC ........................................................ 715/768
See application file for complete search history.

(56) References Cited

U.S. PATENT DOCUMENTS

| 7,860,895 | B1* | 12/2010 | Scofield et al. | 707/802 |
|---|---|---|---|---|
| 2004/0015132 | A1* | 1/2004 | Brown | 604/131 |
| 2004/0081310 | A1* | 4/2004 | Lueckhoff | 379/265.09 |
| 2004/0082345 | A1* | 4/2004 | Lueckhoff | 455/456.3 |
| 2005/0209882 | A1* | 9/2005 | Jacobsen et al. | 705/2 |
| 2006/0294500 | A1* | 12/2006 | Chiang | 717/109 |
| 2007/0050710 | A1* | 3/2007 | Redekop | 715/523 |
| 2009/0287617 | A1* | 11/2009 | Schmidt | 706/10 |
| 2010/0042445 | A1* | 2/2010 | Nicosia | 705/7 |
| 2010/0042933 | A1* | 2/2010 | Ragusa | 715/760 |
| 2010/0114740 | A1* | 5/2010 | Dominguez et al. | 705/27 |
| 2010/0144310 | A1* | 6/2010 | Bedingfield et al. | 455/405 |
| 2010/0313125 | A1* | 12/2010 | Fleizach et al. | 715/702 |

OTHER PUBLICATIONS

Prototype-Window by Xilinus <http://prototype-window.xilinus.com>, downloaded from wayback machine <http://web.archive.org> archived on Jun. 1, 2008.*
Javascript System Beep thread at ASP.NET Forum, published on Mar. 17, 2006, available online at <http://forums.asp.net/t/972998.aspx/1?Javascript+System+Beep>, accessed on Apr. 19, 2011.*
Prototype-Window by Xilinus <http:///prototype-window.xilinus.com>, downloaded from wayback machine <http://web.archive.org> archived on Jun. 1, 2008.*
Javascript System Beep thread at ASP.NET Forum, published on Mar. 17, 2006, available online at <http://forums.asp.net/t/972998.aspx/1 ?Javascript+System+Beep>, accessed on Apr. 19, 2011.*
Introduction to Virtual Desktop Manager, VMWare, published on May 27, 2008.*
"Solid Ice: Provisioning Manager," Qumranet, Apr. 2008, 5 pages.

(Continued)

*Primary Examiner* — William Bashore
*Assistant Examiner* — Reza Nabi
(74) *Attorney, Agent, or Firm* — Lowenstein Sandler LLP (57) ABSTRACT

Techniques for presenting a modal dialog box in a graphical user interface are described herein. According to one embodiment, a semi-transparent panel is displayed superimposed on a graphical user interface (GUI) page in response to a first user interaction with the GUI page. The GUI page provides a user interface for managing a virtualization system. A dialog box is then displayed on top of the semi-transparent panel, where the dialog box is to receive an input from the user. An alert is generated in response to a second user interaction with an area of the semi-transparent panel other than the dialog box, where the alert indicates that the second user interaction is invalid. Other methods and apparatuses are also described.

13 Claims, 6 Drawing Sheets

(56) References Cited

OTHER PUBLICATIONS

"Solid Ice: Virtual Desktop Server (VDS)," Qumranet, Apr. 2008, 6 pages.

"Solid Ice: Connection Broker," Qumranet, Apr. 2008, 7 pages.
"Solid Ice: Overview," Qumranet, Apr. 2008, 15 pages.
"KVM—Kernel-based Virtualization Machine," Qumranet, white paper, 2006, 5 pages.

* cited by examiner

PRESENTING A MODAL DIALOG BOX USING AN INVISIBLE PANEL UNDERNEATH

COPYRIGHT NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the present invention relates generally to graphical user interfaces. More particularly, embodiments relate to techniques for presenting a modal dialog box using an invisible panel underneath.

BACKGROUND

Most modern computer software employs a graphical user interface ("GUI") to convey information to and receive commands from users. A graphical user interface relies on a variety of GUI objects or controls, including icons, toolbars, drop-down menus, text, dialog boxes, buttons, and the like. A dialog box can be in either a modal style or a non-modal style.

Modal dialog boxes require all user interactions to be focused within the dialog box, and usually include an OK button and/or a Cancel button. Modal dialog boxes are used when an application, utility, tool, command or other means requires information before the application can continue, such as a file name, or when a complete set of information is required before proceeding, or when a message such as an alert or warning is given. Modal dialog boxes must be dismissed or closed before the user can proceed with further actions. Conversely, non-modal dialog boxes permit a user to interact with other dialog boxes or other parts of an application, such as with drawing tools. The controls in non-modal dialog boxes can be adjusted at any time, and non-modal dialog boxes do not have to be closed or dismissed before continuing work.

Typically, when a modal dialog box is required, a user interface function such as that provided as a part of software development kit (SDK) (e.g., a Java applet) is invoked which provides a modal dialog box. However, under certain circumstances, e.g., in an HTML (hypertext markup language) page of a Web application, such a function or SDK may not be available.

BRIEF DESCRIPTION OF THE DRAWINGS

The present invention is illustrated by way of example and not limitation in the figures of the accompanying drawings in which like references indicate similar elements.

DETAILED DESCRIPTION

Techniques for presenting a modal dialog box in a graphical user interface are described herein. In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

As described above, typically when a modal dialog box is required, a user interface function such as that provided as a part of SDK is invoked which provides a modal dialog box. However, under certain circumstances, e.g., in an HTML page of a Web application or a Windows presentation foundation (WPF) application, there is no solution or support for a modal dialog. In some situations, the lack of modal dialog features may cause an undesirable experience to a user.

According to one embodiment, a custom dialog is constructed or drawn from a regular panel or a built-in dialog where the custom dialog behaves like a modal dialog. In a particular embodiment, when a request for displaying a modal dialog box is received, for example, in response to a user interaction with a GUI page such as a Web page presented by a software application or a WPF application, a semi-transparent panel is constructed and displayed superimposed on the GUI page. Thereafter, a dialog box is displayed on the top of the semi-transparent panel. The dialog box may be constructed or drawn from a regular panel or a built-in dialog which would normally behaves like a modaless dialog. The semi-transparent panel, which when placed superimposed on the GUI page, darkens or modifies (e.g., reduce) a display resolution of the GUI page which gives an impression to a user that areas of the GUI page outside of the dialog box are inaccessible.

In addition, when the user interacts with (e.g., click) those areas of the GUI page outside of the dialog box, a user interface module (e.g., event handler) of the software application would not react to such user interactions. Alternatively, the software application may generate an alert indicating that such an action is invalid. For example, such an alert may be presented in a visual form such as changing a shape of a mouse (e.g., hour glass shape) or alternatively in an audible form (e.g., a beep). As a result, the semi-transparent panel in combination with the dialog box simulates a modal dialog box in an environment in which a corresponding GUI function is unavailable.

According to one embodiment, the above described modal dialog box implementation may be utilized in a virtualization system such as a graphics remoting or virtual desktop application such as SolidICE™ available from Red Hat. Alternatively it can be implemented as part of a GUI for a management function of a virtualization system such as a virtual desktop control (VDC) server.

Figure 1:
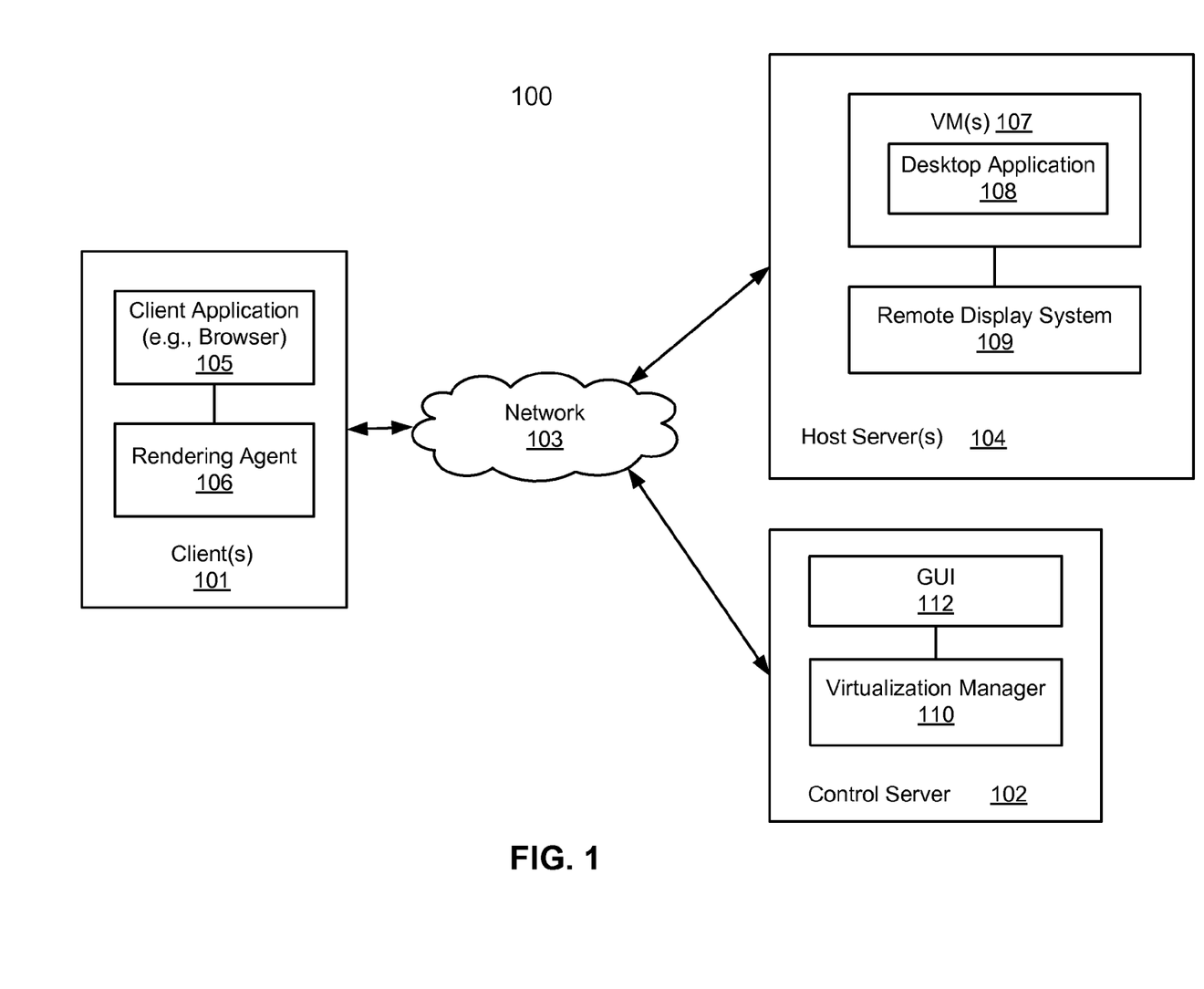
FIG. 1 is a block diagram illustrating an example of a network configuration according to one embodiment of the invention.

FIG. 1 is a block diagram illustrating an example of a network configuration according to one embodiment of the invention. Referring to FIG. 1, network configuration 100 includes, but is not limited to, one or more clients 101 communicatively coupled to a remote server or a cluster of servers 104 over a network 103. Network 103 may be a local area network (LAN) or a wide area network (WAN) and may be a combination of one or more networks. Client 101 can be any computer system in communication with server 104 for remote execution of applications at server 104.

For example, system 100 may be implemented as part of a graphics remoting system. Generally, a client such as client 101 can be a computer system in communication with server 104 for remote execution of applications at server 104. Thus, input data (e.g., mouse and keyboard input) representing application commands is received at the client and transferred over network 103 to server 104. In response to client side data, an application (e.g., desktop application 108) can generate output display commands (e.g., graphics commands, simply referred to herein as graphics data), which may include one or more paint and/or draw operations, for example, in the form of executable instructions. The output display commands can then be transmitted (e.g., as graphics update commands) with an optional compression by remote display system 109 back to the remote client and a remote rendering agent 106 of the remote client can collect the graphics commands and generate corresponding drawing commands for rendering at a display device of the client. Note that a desktop application is utilized herein as an example; however, any other application may also be applied.

In one embodiment, server 104 is configured to host one or more virtual machines 107, each having one or more desktop applications 108 (e.g., desktop operating system). Desktop application 108 may be executed and hosted by an operating system within virtual machine 107. Such an operating system in virtual machine 107 is also referred to as a guest operating system. Multiple guest operating systems and the associated virtual machines may be controlled by another operating system (also referred to as a host OS). Typically, a host OS represents a virtual machine monitor (VMM) (also referred to as a hypervisor) for managing the hosted virtual machines. A guest OS may be of the same or different type with respect to the host OS. For example, a guest OS may be a Windows™ operating system from Microsoft and a host OS may be a Linux operating system available from Red Hat.

Virtual machine 107 can be any type of virtual machines, such as, for example, hardware emulation, full virtualization, para-virtualization, and operating system-level virtualization virtual machines. Different virtual machines hosted by server 104 may have the same or different privilege levels for accessing different resources.

System 100 may be implemented as part of a server or a cluster of servers within a data center of an enterprise entity. It allows enterprises the benefit of centralized desktops without the need to change their applications or infrastructure. Enterprises benefit from an improvement in the manageability, security and policy enforcement for their desktop environment, and consequently, realize a significant reduction in the desktop TCO (total cost of ownership).

Host server 104 and client 101 may be managed by a control server 102 (also referred to as a management server or system). For example, in a graphics remoting application, host server 104 may be implemented as a VDS server while control server 102 may be implemented as a VDC (virtual desktop control) server.

In one embodiment, control server 102 includes a virtualization manager 110 and a graphical user interface 112 to allow a user such as an administrator to access the virtualization manager 110. Virtualization manager 110 is configured to control virtual machines (e.g., virtual desktop solutions), including provisioning, connection protocol, user session logon/logoff, virtual desktop pools, virtual desktop images, and high availability/clustering system. A user (e.g., an administrator) may access the virtualization manager 110 via GUI 112 to perform at least some of the above-mentioned functions. A GUI page may be constructed as an HTML page or a WPF page which can be rendered and displayed via a browser, such as, for example, GUI pages as shown in FIGS. 2A and 2B.

Figure 2A:
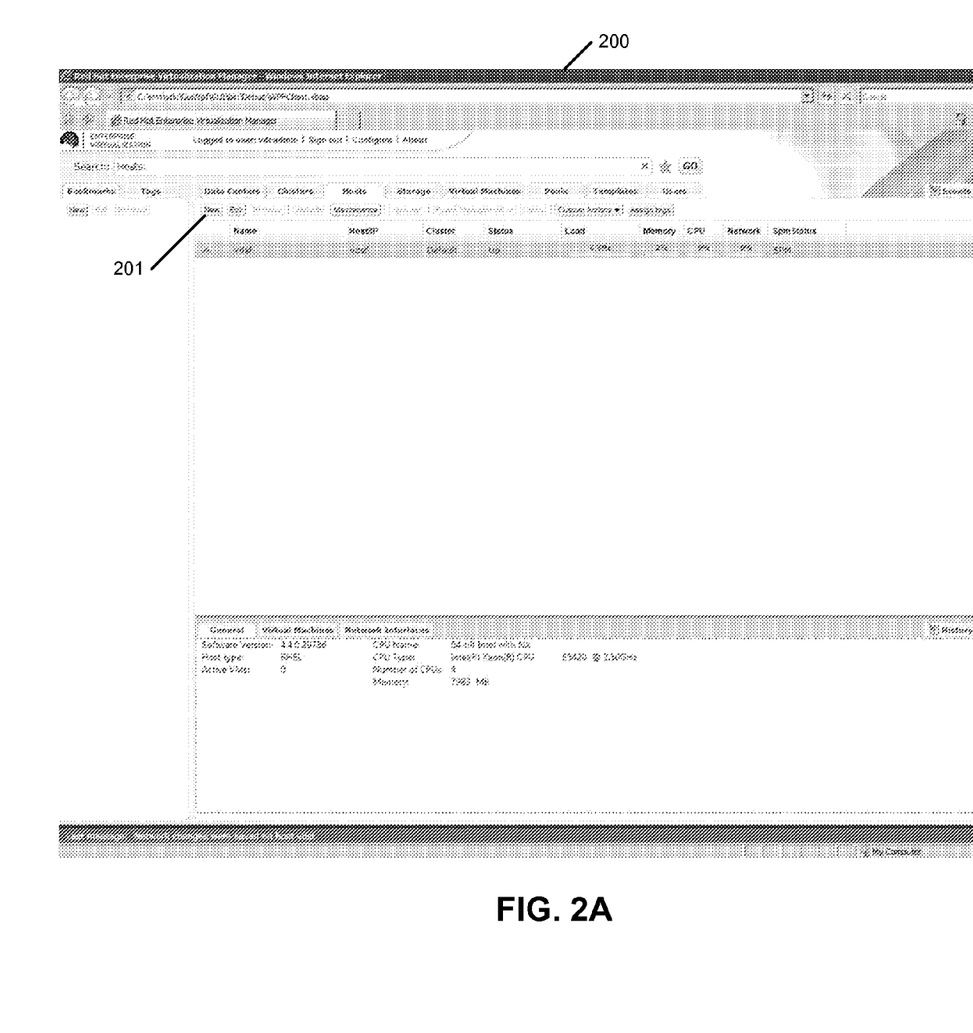
FIGS. 2A and 2B are screenshots illustrating an example of GUI having a modal dialog box according to certain embodiments of the invention.
Figure 2B:
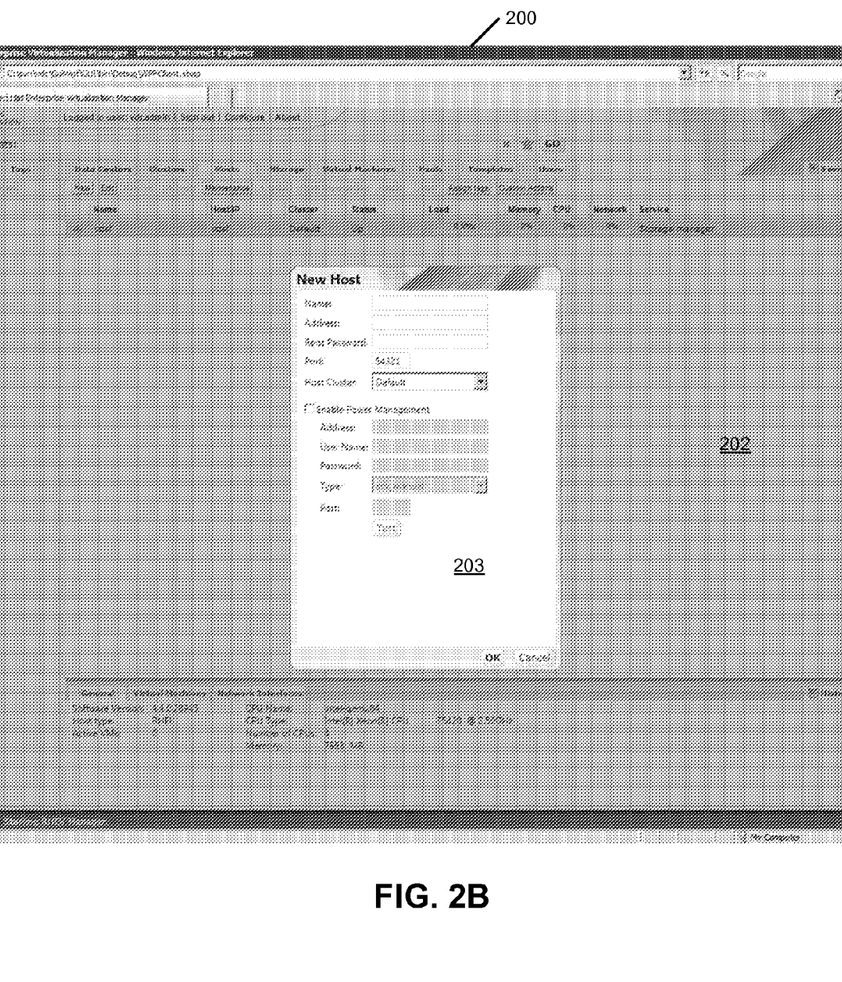

According to one embodiment, in response to a user interaction with a GUI page such as the one shown in FIG. 2A, it is determined whether the user interaction should cause a modal dialog box to be displayed. In this example, a user may activate a button or control (e.g., text-box, select-box, or other input controls) on the GUI page, such as a "new" button 201 on GUI page 200 as shown in FIG. 2A for creating a new host for hosting a VM, as it requires a user to enter certain parameters for the new host before moving forward. If it is determined that a modal dialog box is to be displayed, according to one embodiment, a semi-transparent panel is constructed and displayed on the top of GUI page 200 as shown in FIG. 2B. Referring to FIG. 2B, the semi-transparent panel 202 is displayed on the top of GUI page 200, giving an impression that the buttons or controls of GUI page 200 are not accessible. Thereafter, a dialog box 203 is displayed on the top of the semi-transparent panel 202. The dialog box 203 may be constructed or drawn from a regular panel or a built-in dialog that would normally behaves like a modaless dialog.

In this example, there is no reaction to a user interaction with an area of the semi-transparent panel 202 that is outside of the dialog box 203. Since the semi-transparent panel 202 is displayed on the top of GUI page 200, when a user clicks on the semi-transparent panel 202, a user event handler associated with the semi-transparent panel 202 will receive a corresponding event (e.g., a mouse click event). The event handler of the semi-transparent panel 202 may ignore the event by doing nothing. Alternatively, the event handler may perform certain actions such as generating an alert (e.g., visual or audio alert) indicating that such a user interaction is invalid. As a result, an event handler associated with the underneath GUI page 200 will not receive any user events. The corresponding software application can only continue when the user activates a control within the dialog box 203, for example, by clicking the OK or Cancel button.

Therefore, a combination of the semi-transparent panel 202 and dialog box 203 represents a modal dialog box, without a need of certain SDK or development framework to create the same. Note that the semi-transparent panel 202 does not have to be semi-transparent. It can be fully transparent. By making panel 202 semi-transparent, it gives a user an impression that the underneath functionalities of GUI page 200 are inaccessible. Other configurations may exist. Also note that the above modal dialog box techniques may also be applied in other GUI application, such as, for example, content of a graphics remoting application displayed at a client (e.g., client 101).

Figure 3:
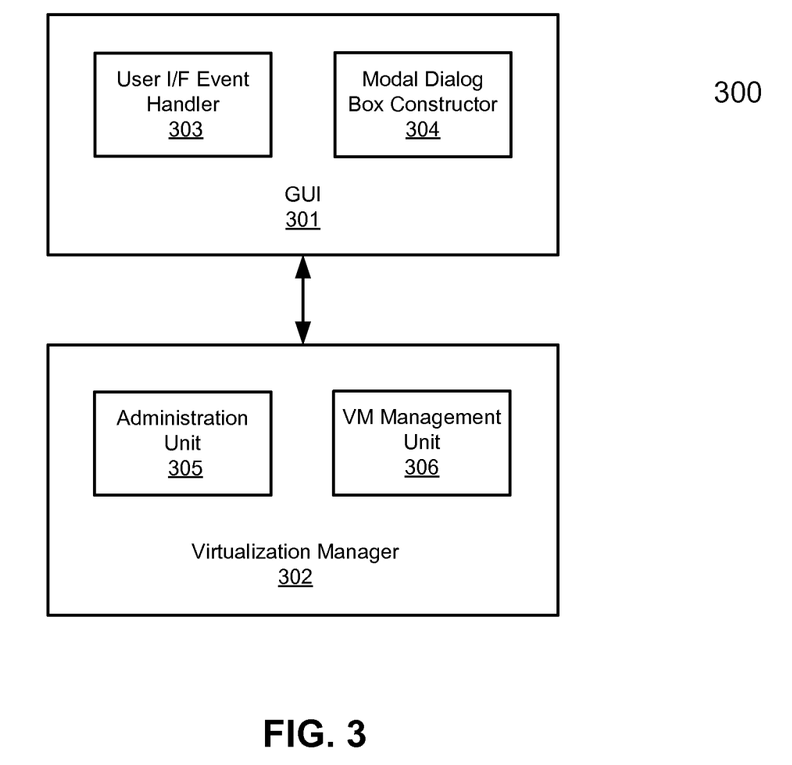
FIG. 3 is a block diagram illustrating an example of a control server according to one embodiment.

FIG. 3 is a block diagram illustrating an example of a control server according to one embodiment. For example, system 300 may be implemented as part of control server 102 of FIG. 1. In one embodiment, system 300 includes, but is not limited to, a graphical user interface 301 (e.g., GUI 112 of FIG. 1) and a virtualization manager 302 (virtualization manager 110 of FIG. 1). In one embodiment, the administration unit 305 together with GUI 301 may provide an administration portal (e.g., a Web portal) to allow an administrator to log in and perform certain administrative functions, such as, for example, managing virtual machines (e.g., virtual desktop solutions), including provisioning, connection protocol, user session logon/logoff, virtual desktop pools, virtual desktop images, and high availability/clustering system.

According to one embodiment, an administrator can communicate with administration unit 305 via GUI 301. For example, an administrator can create or provision a new host via GUI 301, similar to GUI pages shown in FIGS. 2A and 2B. GUI 301 includes a user interface event handler 303 and a modal dialog box constructor 304. The event handler 303 is configured to receive a user interaction from a GUI page as an event (e.g., a click event) and to interpret and/or pass a command associated with the event to administration unit 305 for further processing.

According to one embodiment, in response to a user interaction with a GUI page such as the one shown in FIG. 2A, it is determined via event handler 303 whether the user interaction should cause a modal dialog box to be displayed. If it is determined that a modal dialog box is to be displayed, according to one embodiment, modal dialog box constructor 304 is configured to construct a semi-transparent panel and the semi-transparent panel is displayed on the top of GUI page 200 as shown in FIG. 2B, giving an impression that certain buttons or controls (e.g., button 201) of GUI page 200 are not accessible. Thereafter, a dialog box is displayed on the top of the semi-transparent panel. The dialog box may be constructed or drawn from a regular panel or a built-in dialog that would normally behaves like a modaless dialog In this example, there is no reaction to a user interaction with an area of the semi-transparent panel that is outside of the superimposed dialog box. Since the semi-transparent panel is displayed on top of the GUI page, when a user clicks on the semi-transparent panel, event handler 303 will receive a corresponding event (e.g., a mouse click event). The event handler 303 may simply ignore the event by doing nothing. Alternatively, the event handler 303 may perform certain actions such as generating an alert (e.g., visual or audio alert) indicating that such a user interaction is invalid. As a result, an event handler associated with the underneath GUI page will not receive any user events. The corresponding software application can only continue when the user activates an area within the dialog box, for example, by clicking the OK or Cancel button. Note that some or all of the components as shown in FIG. 3 may be implemented in software, hardware, or a combination of both.

Note that virtualization manager 302 can also perform a variety of other virtualization management functions. For example, virtualization manager 302 may associate a VM with a client when the client registers with the system 300. As a result, a VM can be automatically launched by system 300 for a client, either sequentially after the client has started up or in parallel in a remote host while the client is starting up.

Figure 4:
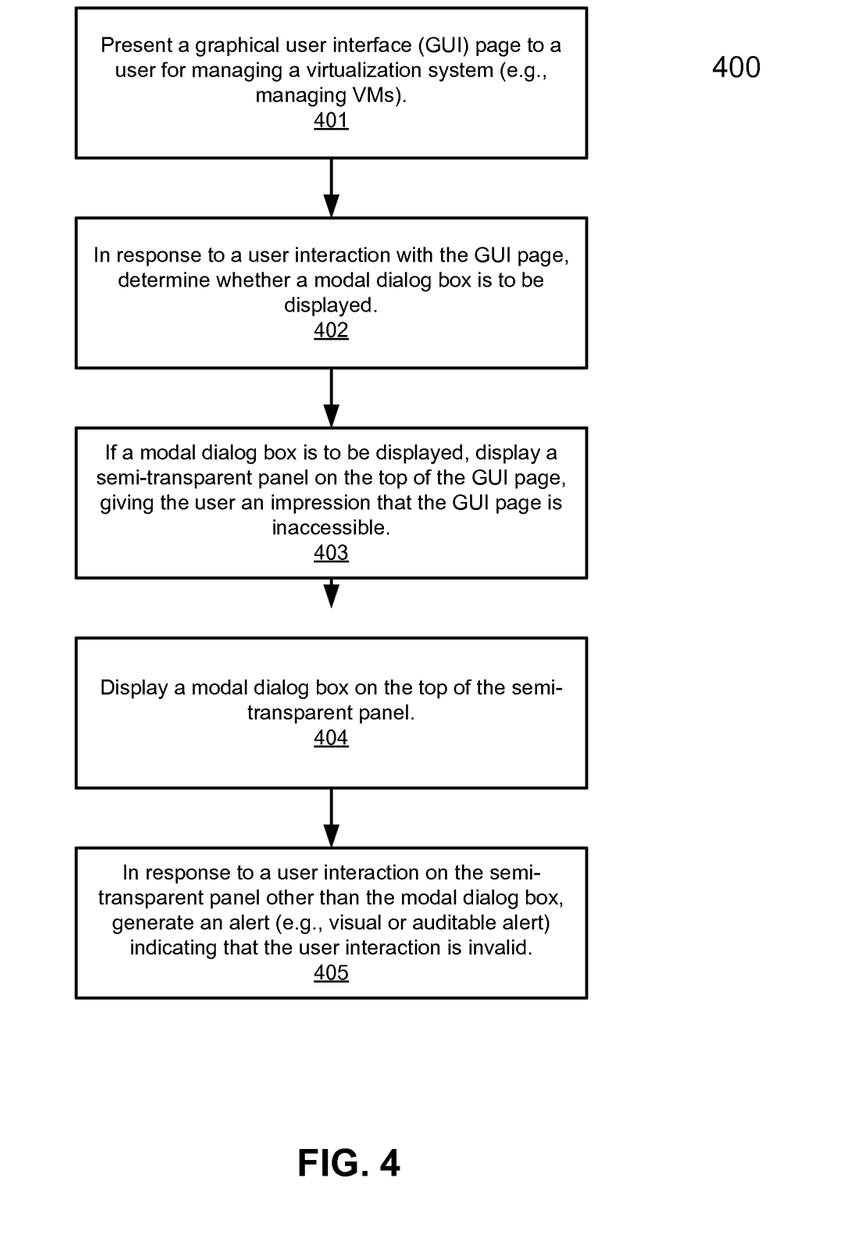
FIG. 4 is a flow diagram illustrating a method for presenting a modal dialog box according to another embodiment.

FIG. 4 is a flow diagram illustrating a method for presenting a modal dialog box according to one embodiment. Note that method 400 may be performed by processing logic which may include software, hardware, or a combination of both. For example, method 400 may be performed by system 300 of FIG. 3. Referring to FIG. 4, at block 401, a graphical user interface page (e.g., FIG. 2A) is presented to a user such as an administrator, for example, for managing a virtualization system. In response to a user interaction with the GUI page, at block 402, processing logic determines whether a modal dialog box is to be presented. If it is determined that a modal dialog box is to be presented, at block 403, a semi-transparent panel is constructed and displayed on the top of the GUI page, giving the user an impression that certain features of the GUI page are inaccessible. At block 404, a dialog box is displayed on the top of the semi-transparent panel (e.g., FIG. 2B). The dialog box may be constructed or drawn from a regular panel or a built-in dialog that would normally behaves like a modaless dialog. In response to a user interaction with the semi-transparent panel other than the dialog box, at block 405, an alert is generated indicating that the user interaction is invalid. The alert may be in a visual or audible form.

Figure 5:
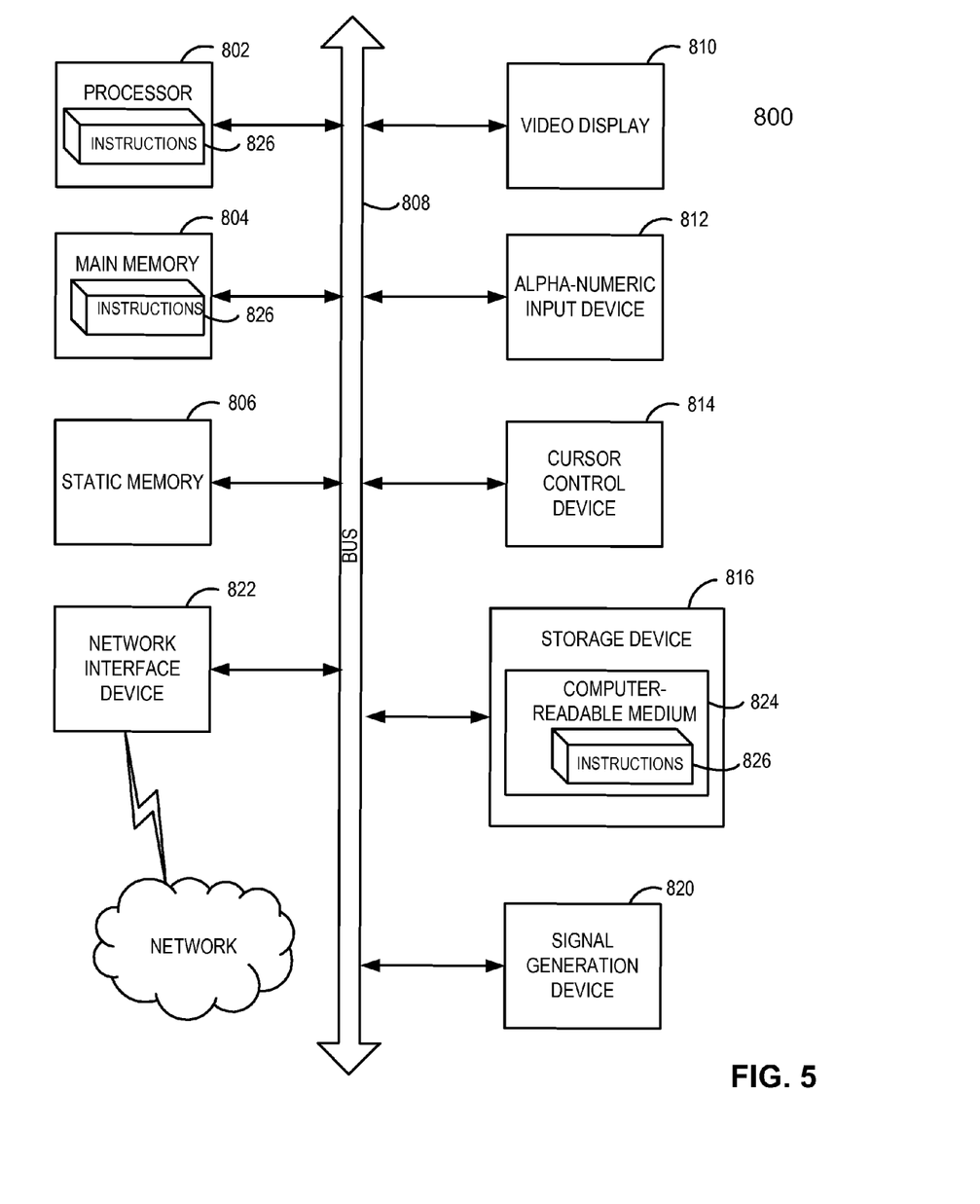
FIG. 5 illustrates a diagrammatic representation of a machine in the exemplary form of a computer system which may be used with an embodiment of the invention.

FIG. 5 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 816, which communicate with each other via a bus 808.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute the instructions 826 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a computer-accessible storage medium 824 (also known as a machine-readable storage medium or a computer-readable medium) on which is stored one or more sets of instructions or software 826 embodying any one or more of the methodologies or functions described herein. The software 826 may also reside, completely or at least partially, within the main memory 804 and/or within the processing device 802 during execution thereof by the computer system 800, the main memory 804 and the processing device 802 also constituting machine-accessible storage media. The software 826 may further be transmitted or received over a network via the network interface device 822.

Thus, techniques for presenting a modal dialog box in a graphical user interface have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A method comprising:
displaying, by a computer system, a panel superimposed on a graphical user interface (GUI) virtualization system management page;
displaying on top of the panel a dialog box comprising an input user interface element, wherein the panel is semi-transparent;
receiving, by an event handler of the panel, an event associated with a user interaction with the panel outside of the dialog box;
generating, by the computer system, an alert in response to the user interaction indicating that the user interaction is invalid, wherein the alert is in a visual form; and
preventing an event handler of the GUI virtualization system management page from receiving the event; wherein the GUI virtualization system management page, the panel, and the dialog box are presented as part of a web portal of a virtualization management system and a presentation application, wherein the virtualization management system manages a virtual machine for a client, and wherein displaying on top of the panel comprises:
receiving a user interaction activating a control of the GUI virtualization system management page for creating a host, which requires a certain parameter to proceed, for hosting a virtual machine.

2. The method of claim 1, wherein the panel indicates that at least one control of the GUI virtualization system management page is inaccessible.

3. The method of claim 2, wherein the semi-transparent panel reduces an overall display resolution of the GUI virtualization system management page.

4. The method of claim 1, wherein the alert is also generated in an audible form.

5. The method of claim 1, wherein the alert is a visual hour glass.

6. A non-transitory computer readable storage medium including instructions that, when executed by a processing device, cause the processing device to execute operations comprising:
displaying a panel superimposed on a graphical user interface (GUI) virtualization system management page;
displaying on top of the panel a dialog box comprising an input user interface element, wherein the panel is semi-transparent;
receiving, by an event handler of the panel, an event associated with a user interaction with the panel outside of the dialog box;
generating, by the computer system, an alert in response to the user interaction indicating that the user interaction is invalid, wherein the alert is in a visual form; and
preventing an event handler of the GUI virtualization system management page from receiving the event; wherein the GUI virtualization system management page, the panel, and the dialog box are presented as part of a web portal of a virtualization management system and a presentation application, wherein the virtualization management system manages a virtual machine for a client, and wherein displaying on top of the panel comprises:

receiving a user interaction activating a control of the GUI virtualization system management page for creating a host, which requires a certain parameter to proceed, for hosting a virtual machine.

7. The non-transitory computer readable storage medium of claim 6, wherein the panel indicates that at least one control of the GUI virtualization system management page is inaccessible.

8. The non-transitory computer readable storage medium of claim 7, wherein the semi-transparent panel reduces an overall display resolution of the GUI virtualization system management page.

9. The non-transitory computer readable storage medium of claim 6, wherein the alert is also generated in an audible form.

10. A system, comprising:
a display device;
a processing device coupled to the display device; and
a memory coupled to the processing device for storing computer instructions, which when executed from the memory, cause the processing device to:
display a panel superimposed on a graphical user interface (GUI) virtualization system management page,
display on top of the panel a dialog box comprising an input user interface element, wherein the panel is semi-transparent,
receive, by an event handler of the panel, an event associated with a user interaction with the panel outside of the dialog box;
generate an alert in response to the user interaction indicating that the user interaction is invalid, wherein the alert is in a visual form; and
prevent an event handler of the GUI virtualization system management page from receiving the event; wherein the GUI virtualization system management page, the panel, and the dialog box are presented as part of a web portal of a virtualization management system and a presentation application, wherein the virtualization management system manages a virtual machine for a client, and wherein displaying on top of the panel comprises:
receive a user interaction activating a control of the GUI virtualization system management page for creating a host, which requires a certain parameter to proceed, for hosting a virtual machine.

11. The system of claim 10, wherein the panel indicates that at least one control of the GUI virtualization system management page is inaccessible.

12. The system of claim 11, wherein the semi-transparent panel reduces an overall display resolution of the GUI virtualization system management page.

13. The system of claim 10, wherein the alert is also generated in an audible form.

* * * * *